(12) United States Patent
Burton

(10) Patent No.: US 6,758,622 B2
(45) Date of Patent: Jul. 6, 2004

(54) BALL SOCKET WITH IMPROVED PULL-OUT FORCE RESISTANCE

(75) Inventor: John E. Burton, Ludington, MI (US)

(73) Assignee: Burton Technologies LLC, Ludington, MI (US)

( * ) Notice: Subject to any disclaimer, the term of this patent is extended or adjusted under 35 U.S.C. 154(b) by 89 days.

(21) Appl. No.: 09/785,429

(22) Filed: Feb. 16, 2001

(65) Prior Publication Data

US 2002/0114660 A1 Aug. 22, 2002

(51) Int. Cl.[7] .............................. F16C 11/00; F16D 1/12; F16D 3/00
(52) U.S. Cl. ........................................ 403/7; 403/122
(58) Field of Search .................... 403/77, 141, 142, 403/143, 122, 135, 137, 138

(56) References Cited

U.S. PATENT DOCUMENTS

| | | | |
|---|---|---|---|
| 999,898 A | * | 8/1911 | Stafford |
| 1,022,197 A | * | 4/1912 | Kiel |
| 2,845,290 A | * | 7/1958 | Latzen |
| 2,871,868 A | * | 2/1959 | Faasse et al. |
| 2,910,310 A | * | 10/1959 | Mulac |
| 3,396,554 A | | 8/1968 | Westercamp |
| 3,564,984 A | | 2/1971 | Alexander |
| 4,084,913 A | | 4/1978 | Schenk ...................... 403/141 |
| 4,111,570 A | | 9/1978 | Morel ......................... 403/18 |
| 4,200,405 A | | 4/1980 | Bauer ......................... 403/142 |
| 4,465,393 A | | 8/1984 | Dieckmann ................. 403/76 |
| 4,499,785 A | * | 2/1985 | Bennett et al. ......... 403/141 X |
| 4,574,334 A | | 3/1986 | Igura ............................ 362/66 |
| 4,607,976 A | | 8/1986 | Peek et al. ................... 403/77 |
| 4,689,725 A | | 8/1987 | Saijo et al. ................. 362/66 |
| 4,694,705 A | * | 9/1987 | Frankhouse et al. .... 403/141 X |
| 4,703,399 A | | 10/1987 | Van Duyn et al. ........... 362/66 |
| 4,707,769 A | | 11/1987 | Van Duyn ................... 362/66 |
| 4,707,770 A | | 11/1987 | Van Duyn ................... 362/66 |
| 4,707,771 A | | 11/1987 | Van Duyn et al. ............ 362/66 |
| 4,709,306 A | | 11/1987 | Harris et al. ................. 362/68 |
| 4,796,325 A | * | 1/1989 | Bortman ................. 403/142 X |
| 4,839,785 A | | 6/1989 | Ohishi ........................ 362/418 |
| 4,845,598 A | | 7/1989 | Watanabe et al. ............ 362/61 |
| 4,849,860 A | | 7/1989 | Schauwecker ............... 362/61 |
| 4,882,658 A | | 11/1989 | Allen ........................... 362/61 |
| 4,974,123 A | | 11/1990 | Luallin et al. ................ 362/66 |
| 5,011,322 A | | 4/1991 | Schauwecker ............. 403/141 |
| 5,034,870 A | | 7/1991 | Weber ........................ 362/428 |
| 5,045,987 A | | 9/1991 | Hebert ....................... 362/421 |
| 5,047,904 A | | 9/1991 | Vraux ......................... 362/66 |
| 5,063,481 A | | 11/1991 | Martin ........................ 362/61 |
| 5,095,411 A | | 3/1992 | Peck et al. ................... 362/66 |
| 5,153,976 A | | 10/1992 | Benchaar et al. ............. 29/436 |
| 5,161,877 A | | 11/1992 | Wright et al. ................ 362/66 |
| 5,186,531 A | | 2/1993 | Ryder et al. .................. 362/66 |
| 5,186,532 A | | 2/1993 | Ryder et al. .................. 362/66 |
| 5,258,894 A | | 11/1993 | Bivens ........................ 362/66 |
| 5,270,907 A | | 12/1993 | Lisak .......................... 362/66 |
| 5,360,282 A | | 11/1994 | Nagengast et al. ......... 403/131 |
| 5,365,415 A | | 11/1994 | Schmitt et al. .............. 362/66 |
| 5,381,317 A | | 1/1995 | Schmitt et al. .............. 362/66 |
| 5,428,511 A | | 6/1995 | Luallin et al. ............... 362/66 |
| 5,483,425 A | | 1/1996 | Luallin et al. ............... 362/61 |

(List continued on next page.)

Primary Examiner—Christopher J. Novosad
(74) Attorney, Agent, or Firm—Brian G. Gilpin; Godfrey & Kahn, S.C.

(57) ABSTRACT

A ball socket for connection with a ball stud resists accidental pull-out of the ball stud. The ball socket includes arms that form a socket cup for retaining the ball stud. The arms allow relatively easy insertion of the stud head, yet greatly resist accidental pull-out. The ball socket may be used in connection with disengageable or conventional ball studs. The ball socket may be an in-line design, peanut-style, or some other design. One known effective application of the present invention is in automotive lamp assemblies. The in-line socket may include a centrally located mounting hole and an undercut which forms a chamber for trapping the head of a mounting screw to facilitate assembly to the reflector.

3 Claims, 9 Drawing Sheets

U.S. PATENT DOCUMENTS

| | | | |
|---|---|---|---|
| 5,508,896 A | 4/1996 | Suehiro et al. | 362/66 |
| 5,546,283 A | 8/1996 | Ohtsuka et al. | 362/61 |
| 5,577,836 A | 11/1996 | Vent et al. | 362/61 |
| 5,626,433 A * | 5/1997 | Iwamoto | 403/141 X |
| 5,642,935 A | 7/1997 | Schmitt | 362/294 |
| 5,653,548 A | 8/1997 | Amdahl | 403/133 |
| 5,673,992 A | 10/1997 | Schmitt | 362/66 |
| 5,678,915 A | 10/1997 | Shirai et al. | 362/61 |
| 5,707,133 A | 1/1998 | Burton | 362/66 |
| 5,741,059 A | 4/1998 | Kusagaya | 362/66 |
| 5,743,618 A | 4/1998 | Fujino et al. | 362/61 |
| 5,746,559 A | 5/1998 | Shirai | 411/182 |
| 5,833,347 A | 11/1998 | Nakamura et al. | 362/66 |
| 5,915,831 A | 6/1999 | Bonin et al. | 362/519 |
| 6,113,301 A | 9/2000 | Burton | 403/122 |

* cited by examiner

BALL SOCKET WITH IMPROVED PULL-OUT FORCE RESISTANCE

BACKGROUND OF THE INVENTION

This invention relates generally to pivot joints, and in particular to a pivot joint useful for connecting a headlamp adjuster to a reflector inside a headlamp assembly or an external reflector and lens headlamp assembly. The improved ball socket can be used effectively with disengageable ball stud or conventional spherical, semi-spherical or "eared" ball studs.

Pivotable spherical joints, commonly referred to as ball joints, include a ball stud engaged in a socket. Such joints have a wide variety of applications where a pivotable connection between two parts is desirable. For example, they may be used in many types of linear actuators and have been found to be particularly useful in automotive lamp assemblies. As seen in U.S. Pat. No. 5,707,133, the disclosure of which is incorporated herein by reference, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. The reflector mounts inside the housing on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Another type of automotive headlamp assembly that uses linear actuators is shown in U.S. Pat. No. 5,360,282. In this type of headlamp assembly the linear actuator is mounted to a bracket and the ball joint end supports a reflector, lens and light bulbs. This type of application requires a higher strength ball joint due to the additional weight being supported. In particular, pull-out strength of the ball joint needs to be greater to withstand vibration.

While one possible application of the present invention is in headlamp assemblies, other applications are possible and references to use in a headlamp assembly should not be deemed to limit the application of the present invention. Additionally, while the improved ball socket design described herein may be used with a disengageable ball stud, such as the one described in U.S. Pat. No. 6,113,301, the disclosure of which is incorporated by reference, it can also be used advantageously with ball studs having "ears" or engaging tabs or semi-spherical ball stud designs. Examples of such adjusters are disclosed in U.S. Pat. Nos. 4,689,725 and 5,186,531, an example of an "eared" ball stud is shown in FIG. 13, and an example of a semi-spherical ball stud is shown in FIG. 12.

Conventional ball joints for use in automotive lamp assemblies typically include a ball stud with a spherical engagement head extending from an adjuster. The ball stud is moveable linearly in and out of the adjuster. Examples of such ball studs and corresponding sockets are shown in FIGS. 4 and 5 of U.S. Pat. No. 4,689,725; FIG. 1 of U.S. Pat. No. 5,673,992; FIG. 2 of U.S. Pat. No. 5,095,411; and FIGS. 10–14 of U.S. Pat. No. 5,186,532. Additionally, several U.S. Patents disclose ball joints for use in headlamp adjusting mechanisms: 4,974,123, 5,047,904, and 5,063,481.

As is known in the art, ball studs interface with a plastic socket 20, such as the one shown in FIGS. 1 and 2 and in U.S. Pat. No. 5,653,548. The sockets 20 are attached to the reflector such that movement of the ball stud effectuates movement of the reflector. For example, socket 20 is attached to a boss 30 with a fastener 31. Boss 30 has an aperture 32 therein for receiving the fastener 31. The interface between the ball stud (not shown) and the socket 20 is such that the head of the ball stud cannot be readily removed from the socket 20 once the head is disposed therein. This is because fingers or tabs 22 point inwardly toward socket cup 24 at approximately a forty-five degree angle to retain the head in socket 20. The ball stud head cannot be allowed to slip from socket 20 once the adjuster is installed, or the adjuster will not be able to adjust the orientation of the reflector. When engaged in socket 20, the ball stud head is free to pivot within the socket cup 24 of socket 20.

While functionally quite effective, there is at least one shortcoming to using ball studs in conventional "tabbed" sockets. This shortcoming is that the head 22 can be pulled out of socket 20 under certain conditions of operation, such as vibration while supporting heavier reflectors or in heavier headlamp assemblies like the one previously referenced in U.S. Pat. No. 5,360,282, leaving the adjuster non-operational. This unexpected pull-out generally occurs because tabs 22 are flexible. Tabs 22 must be flexible enough to allow the head to be inserted into socket 20, while at the same time resist pull-out. Though pull-out of the ball stud is resisted to some degree of success, if enough pull-out force is applied, the tabs 22 deflect downward toward the socket cup 24 and the ball stud head "pops out." Reducing the flexibility of tabs 22 is not an option because it would either be to difficult to insert the ball stud head into socket 20, or the elasticity of the tabs 22 would be lessened to the degree that they would break off during insertion of the ball stud.

Accordingly, the need exists for an improved ball socket that securely retains a ball stud placed therein, can be effectively used in connection with disengageable or conventional ball studs, is cost effective, and resists accidental pull-out. The present invention relates to an improved ball joint which is capable of being used in automotive lamp assemblies and solves the problems raised or not solved by existing ball joints. Of course, the present invention may be used in a multitude of non-automotive lamp situations where similar performance capabilities are required.

SUMMARY OF THE INVENTION

The present invention provides a ball socket that is cost-effective, easily installed in the lamp, securely retains a ball stud placed therein, and can be effectively used in connection with disengageable or conventional ball studs. Further, ball studs can be selectively inserted and removed from the corresponding socket as desired, yet greatly resist accidental pull-out of the ball stud.

The ball socket for use with a ball stud and a mounting screw is generally constructed so that the socket has a face plate having an opening for receiving the ball stud, and a combination of support legs and arms extending from the face plate to form a socket cup for receiving the ball stud. The ball socket includes a socket body having a socket cup with an undercut portion defining a chamber. This chamber is designed to hold the head of a mounting screw. A mounting screw having a head may be placed in the chamber of the socket, yet still rotate for attachment purposes. The arms extend from the face plate to the opposite end of the socket, near the undercut portion. The arms have an upper portion, middle portion and a bottom portion. During insertion of the ball stud into the socket cup, at least the upper portion and middle portion of each arm deforms.

The ball socket may be used in a headlamp assembly. Generally, the headlamp assembly is composed of a reflector having a boss and a ball socket mounted to the boss by a mounting screw. The ball socket has an opening for receiving a ball stud into the adjacent socket cup having several arms. The headlamp adjuster has a ball stud extending therefrom, which is engaged in the ball socket.

The ball socket can accept different types of ball studs, either conventional or disengageable. The ability to use the socket with a wide variety of ball studs provides a significant benefit to headlamp assemblers because it allows the use of one style of socket with a number of types of ball stud.

While one possible application of the present invention is in headlamp assemblies, many other applications are possible and references to use in a headlamp assembly should not be deemed to limit the uses of the present invention. The terms "ball stud," "engagement head," or "head" as used herein should not be interpreted as being limited to spherical or semispherical shapes, rather, the engagement heads of ball studs in accordance with the present invention may have a wide variety of shapes and may include protrusions having semispherical or otherwise pivotably-shaped tips. The arms used in the socket can be a wide variety of shapes capable of selectively retaining the ball stud in the socket. These and other objects and advantages of the present invention will become apparent from the detailed description, claims, and accompanying drawings.

DETAILED DESCRIPTION OF THE PREFERRED EMBODIMENTS

Figure 6:
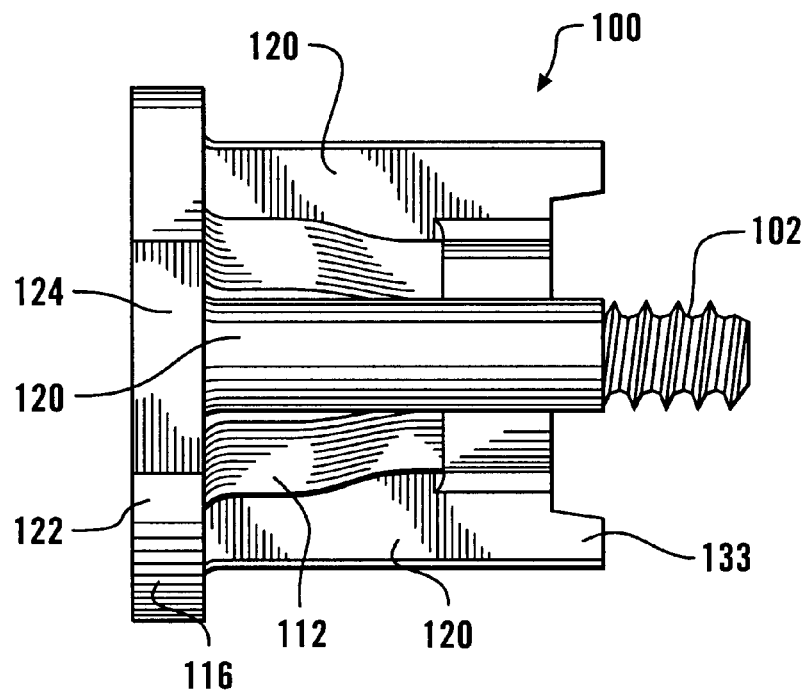
FIG. 6 is a side elevational view of the socket shown in FIG. 3.
Figure 7:
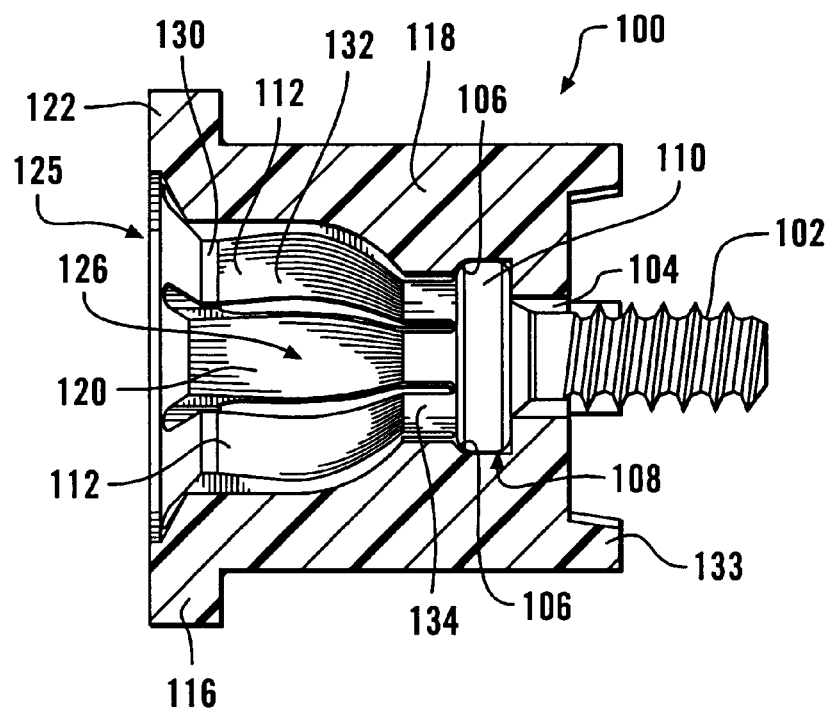
FIG. 7 is a side cross-sectional view of the socket shown in FIG. 3 taken generally along the line 7—7 in FIG. 4.

An improved ball socket 100 is shown in FIGS. 3–9. Socket 100 can be effectively used with conventional ball studs or disengageable ball studs. Referring to FIG. 7, socket 100 is preferably a one-piece design that includes a mounting screw 102 retained therewithin and extending through a mounting screw hole 104. This allows the mounting point of socket 100 to be very close to the point where a ball stud is retained therein which results in reduced deflection of the part and more consistent aiming. However, it should be understood that the present improvement could be used with other prior art sockets that do not have a mounting screw 102 contained therein. One such embodiment is shown in FIG. 10 and described herein.

Socket 100 retains mounting screw 102 therein by providing an undercut portion 106 and a chamber 108 which secures head 110 of mounting screw 102 after being snap-fitted into socket 100. The diameter of undercut portion 106 is smaller than the diameter of mounting screw head 110. Thus, mounting screw 102 cannot be easily dislodged or separated from socket 100, but is still allowed to rotate inside chamber 108 because chamber 108 is slightly larger than head 110. The combined socket unit can be easily handled on an assembly line and installed using automated equipment, or more easily handled by hand.

Figure 9:
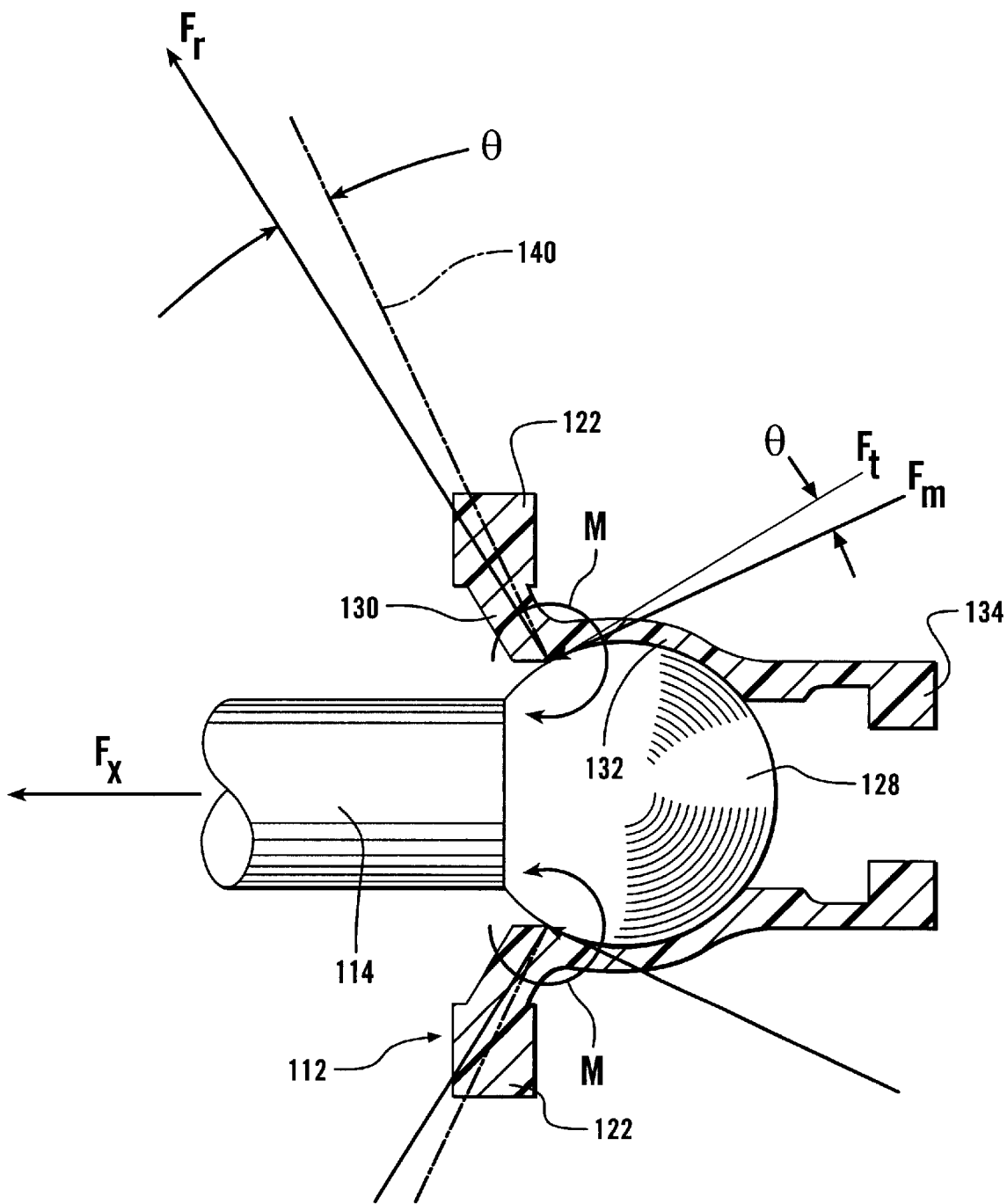
FIG. 9 is a schematic diagram showing the forces exerted on the socket as a ball stud is pulled from a seated position within a socket in accordance with the present invention.
Figure 10:
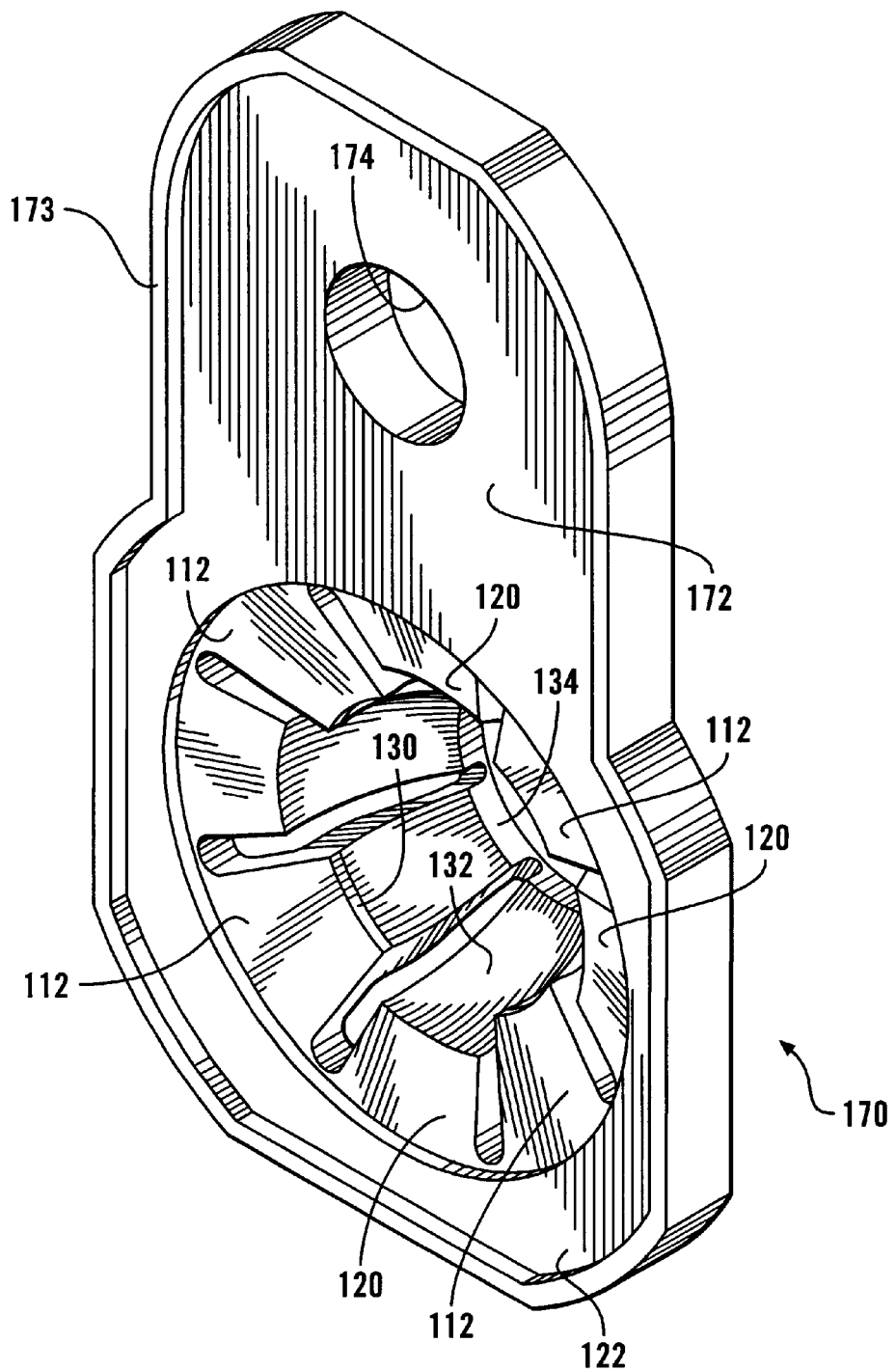
FIG. 10 is a perspective view of an alternative embodiment of the present invention having a peanut-style extension.

As best seen in FIGS. 7 and 9, socket 100 has arms 112 that are capable of retaining a ball stud 114. Arms 112 are the means by which a socket cup 126 is formed for retaining a ball stud. Arms 112 extend from the opening portion 116 of socket 100, down to the base portion 118, which is located next to chamber 108. The function of the arms 112 is to provide improved resistance against accidental pull-out of the ball stud 114. Thus, due to the construction of arms 112, one must apply a greater linear force to pull ball stud 114 out of socket 100 than is required to push ball stud 114 into socket 100. While the arms 112 work with a disengageable ball stud, the improved socket 100 may also be used with conventional ball studs.

For installation to a headlamp assembly (not shown), the mounting screw 102 is rotatable within the socket 100. Alternative means for retaining the mounting screw 102 in the socket 100 could also be used, e.g., interference between the thread of the mounting screw 102 and the mounting screw hole 104, and interference between the head 110 of the mounting screw 102 and the inside of the socket 100.

Figure 4:
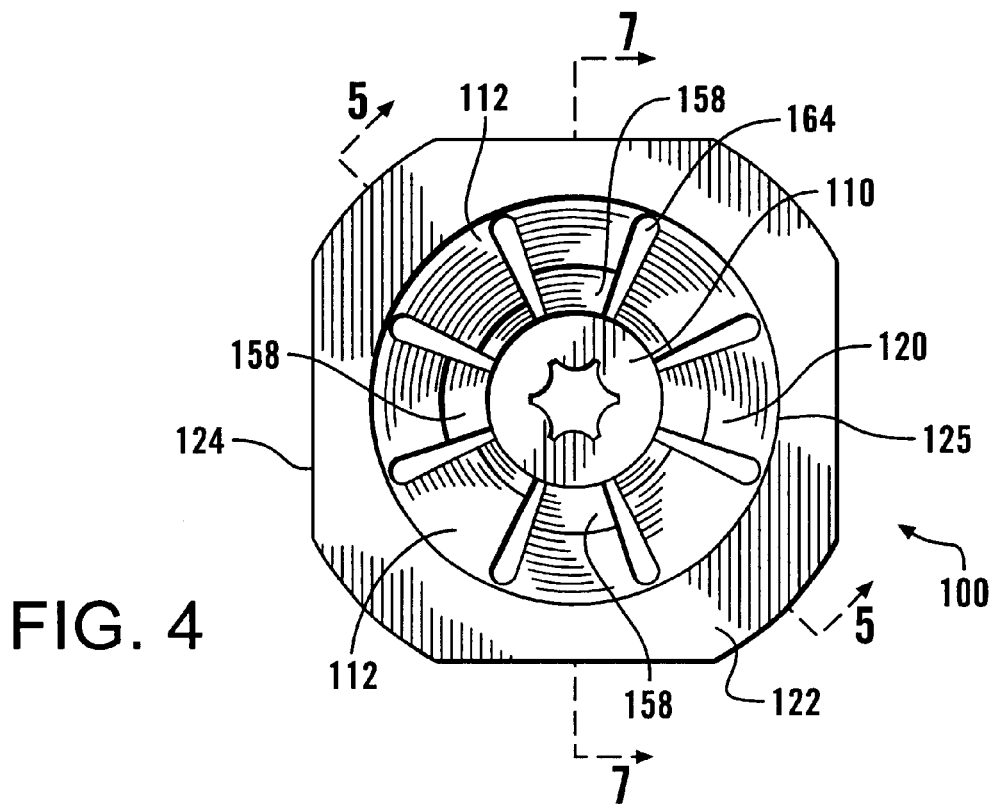
FIG. 4 is an end elevation of the socket shown in FIG. 3.
Figure 5:
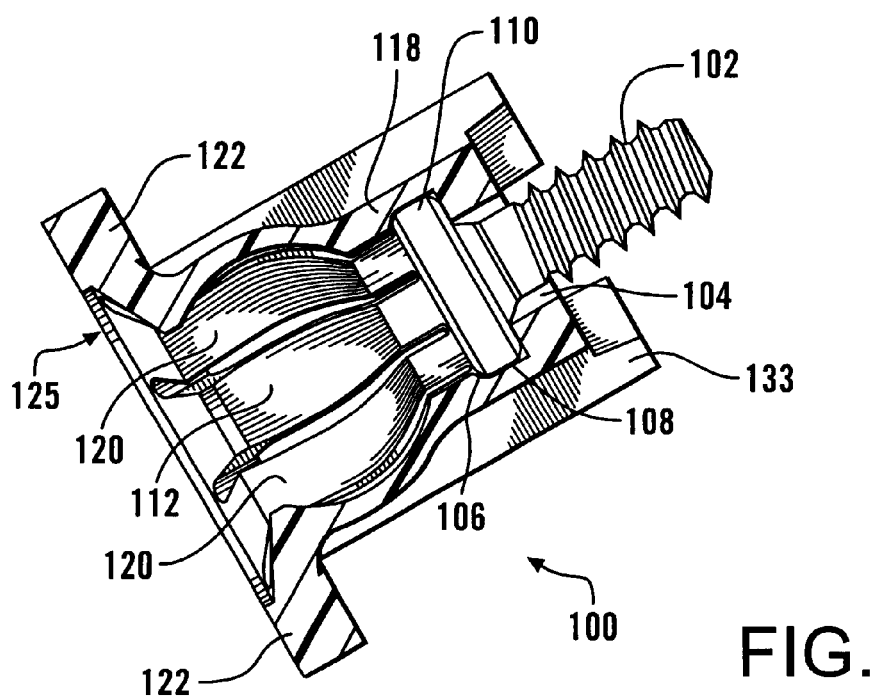
FIG. 5 is a bottom cross-section of the socket shown in FIG. 3 taken generally along the line 5—5 in FIG. 4.

As seen in FIG. 6, the improved socket 100 further may include support legs 120 extending from a face plate 122. Support legs 120 provide additional structural stability to the socket and keep face plate 122 from moving substantially during insertion of the ball stud. As seen in FIG. 4, face plate 122 preferably includes flat edges or flats 124. The interior portion of socket 110 where a ball stud is retained is referred to generally as the socket cup 126. When a ball stud is inserted into socket 100 through opening 125 in face plate 122, the ball is pivotally secured within the socket cup of 126 of socket 100 by arms 112, and optionally, support legs 120. Support legs 120 could be replaced with a contiguous body, but having separate support legs 120 is preferable to reduce weight and material costs. Also, while having four arms has been found to be an effective design, other numbers could be used. Likewise, while having four support legs 120 has been an effective design, other numbers could be used.

Figure 3:
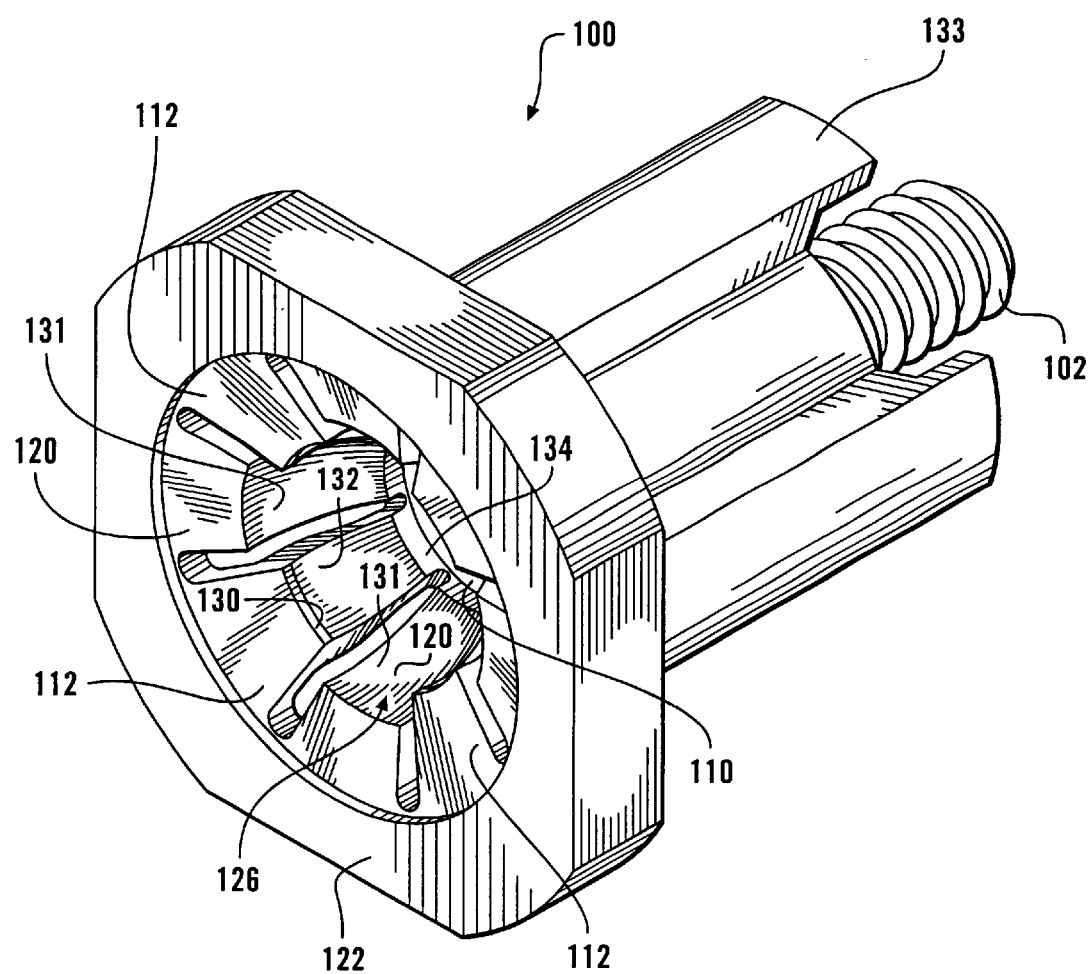
FIG. 3 is a perspective view of one embodiment of a socket in accordance with the present invention.

Arms 112 are generally curved to preferably conform to a substantially spherical shaped ball stud head. However, other curvatures could be used for different head shapes. Referring to FIGS. 3 and 4, it is also preferable that the upper portion 130 of arms 112 extends toward the center axis of socket 100 more than the upper portions 131 of support legs 120. In this respect, the arms 112 substantially form socket cup 126. Support legs 120 do riot operate to retain the ball stud in socket cup 126.

Figure 1:
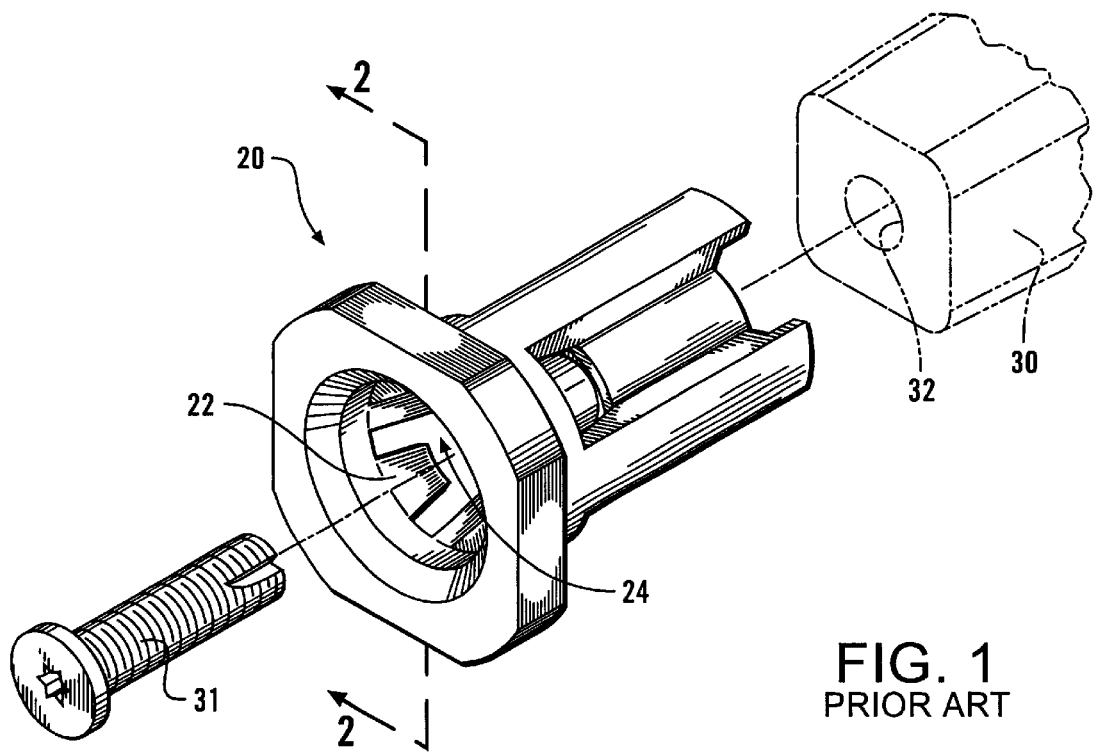
FIG. 1 is a perspective view of a prior art socket shown in relation to a mounting screw and mounting boss.

Preferably, socket 100 further includes leg extensions 133 to allow socket 100 to non-rotatably mount on a generally square boss 30, such as that shown in phantom in FIG. 1. This non-rotatable mounting is effectuated by the leg extensions 133 being placed on each side of such boss when the mounting screw 102 is threaded into a mounting hole, such as the mounting hole 32 seen in square boss 30. This non-rotatable mounting allows the socket 100 to be effectively used with a disengageable ball stud because it ensures the proper orientation of the arms 112. Of course, other shaped bosses could be used with the appropriate modification of the leg extensions of the socket to match the particular shape characteristics of the boss. Additionally, if a particular application allows rotation of the socket 100, leg extensions 133 could be eliminated.

Figure 8A:
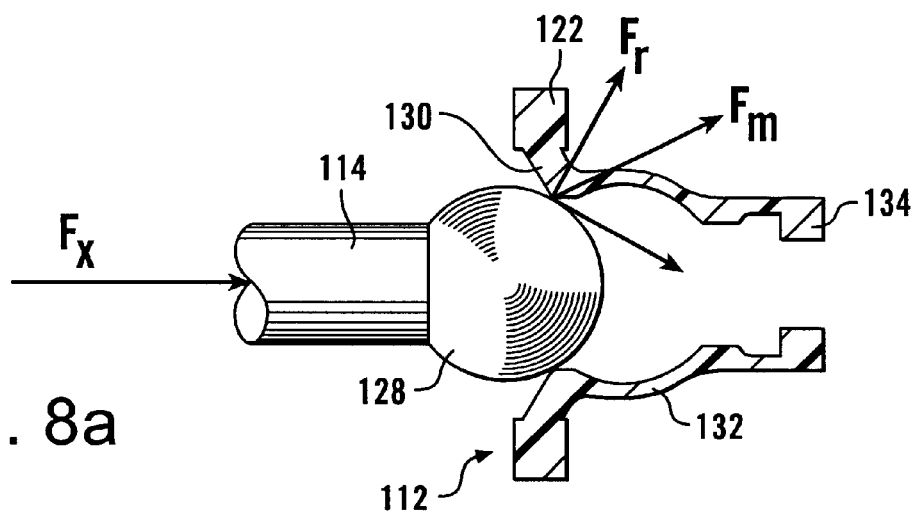
FIG. 8a is a schematic side view of a ball stud prior to insertion into a socket in accordance with the invention as shown in FIG. 3.
Figure 8B:
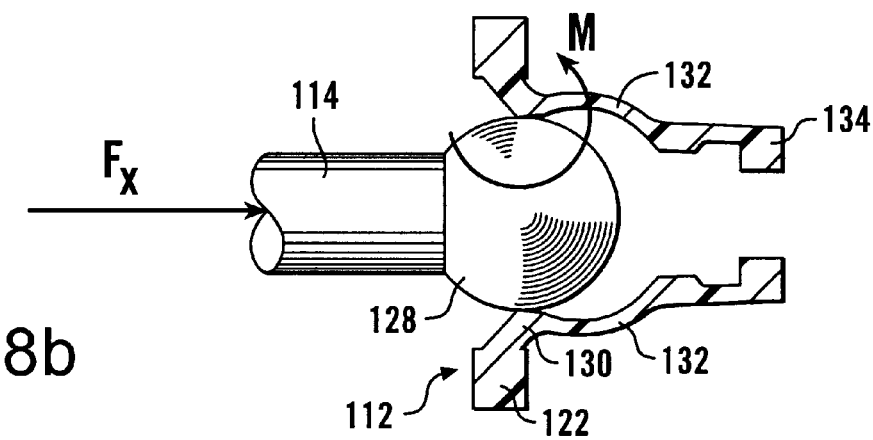
FIG. 8b is a schematic side view of a ball stud during insertion into a socket in accordance with the invention as shown in FIG. 3.
Figure 8C:
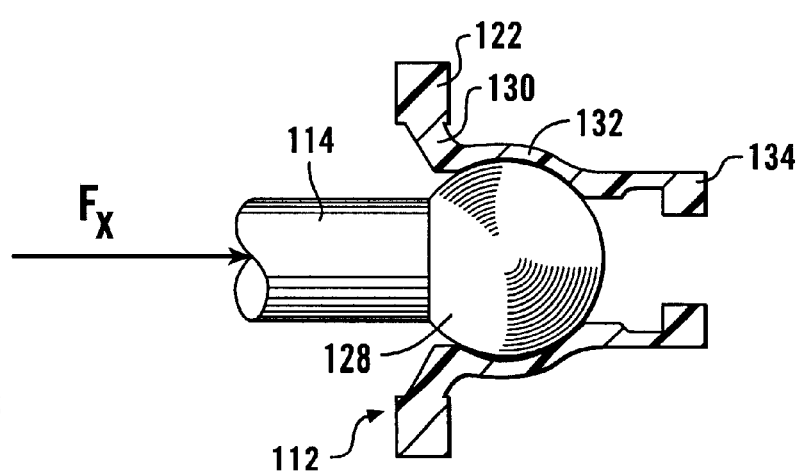
FIG. 8c is a schematic side view of a ball stud after insertion into a socket in accordance with the invention as shown in FIG. 3.

Installing the head 128 of a ball stud 114 into the corresponding, socket 100 of the present invention is quite simple. FIGS. 8($a$)–($c$) shows how a conventional round ball stud is inserted. First, a positive linear force Fx is exerted on the ball stud 114 so that the head 128 is directed into the socket cup 126. This direction is substantially parallel to the axis of mounting screw 102, as show in FIG. 7. Force Fx is great enough so that arms 112 undergo elastic deformation, as shown in FIG. 8($b$). This deformation results from the moment M applied to the upper segment 130 of arm 112. Specifically, during deformation, face plate 122 remains substantially stationary in the radial direction thereof. The upper segment 130 of each arm 112 moves slightly into socket cup 126 due to moment force Fm, which results from the combined radial and tangential forces, Fr and Ft. The applied moment M moves the upper segment 130 of each arm 112, and further causes each middle segment 132 to move in an outward direction with respect to socket cup 126. The position of bottom segment 134 of arm 112, located adjacent undercut portion 106 (not shown), remains substantially unchanged. As seen in FIG. 8($c$), the arms 112 return to their initial position once head 128 is contained within socket cup 126. During insertion of a substantially spherical head 128, head 128 "snaps" into the socket cup 126 just after the leading hemisphere of head 128 moves past the arm's upper segment 130 where the moment force is applied. Thus, the ball stud is inserted with a "snap fit."

Removing a conventional ball stud 114 from the socket cup is not as simple as the insertion process. The reason that socket 100 resists ball stud pull-out is that the positive linear force Fx required to insert head 128 into socket 100 is less than the negative linear force Fx required to remove head 128 from socket 100. Referring to FIG. 8($a$), the positive linear force Fx is translated to tangential and radial components, Ft and Fr respectively, at the spherical surface of head 128. Likewise, in FIG. 9, the negative linear force Fx is translated into negative Fr and Ft components with respect to the surface of head 128. The moment force Fm is perpendicular to the longitudinal axis 140 of upper segment 130, and differs in direction from force Ft by an angle θ. Unlike the previous case when head 128 was inserted into socket 100, upper segment 130 cannot easily move under the moment force Fm because it is restrained by arm 112. Specifically, the bottom segment 134 of arm 112 is restrained so that arm 112 cannot move significantly in the negative Fx direction. Head 128 can only be removed by plastically deforming the upper segment 130 of arm 112, by applying a hoop stress to faceplate 122 that is large enough to cause deformation thereof, or a combination of both. Thus, it is preferable that faceplate 122 is shaped to resist the hoop stress.

Figure 2:
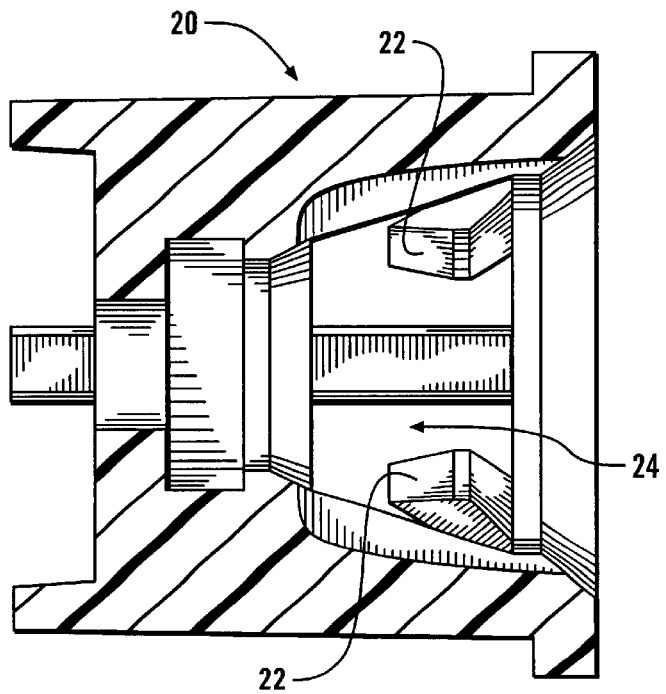
FIG. 2 is a cross-section of the prior art socket shown in FIG. 1 taken generally along the line 2—2.
Figure 12:
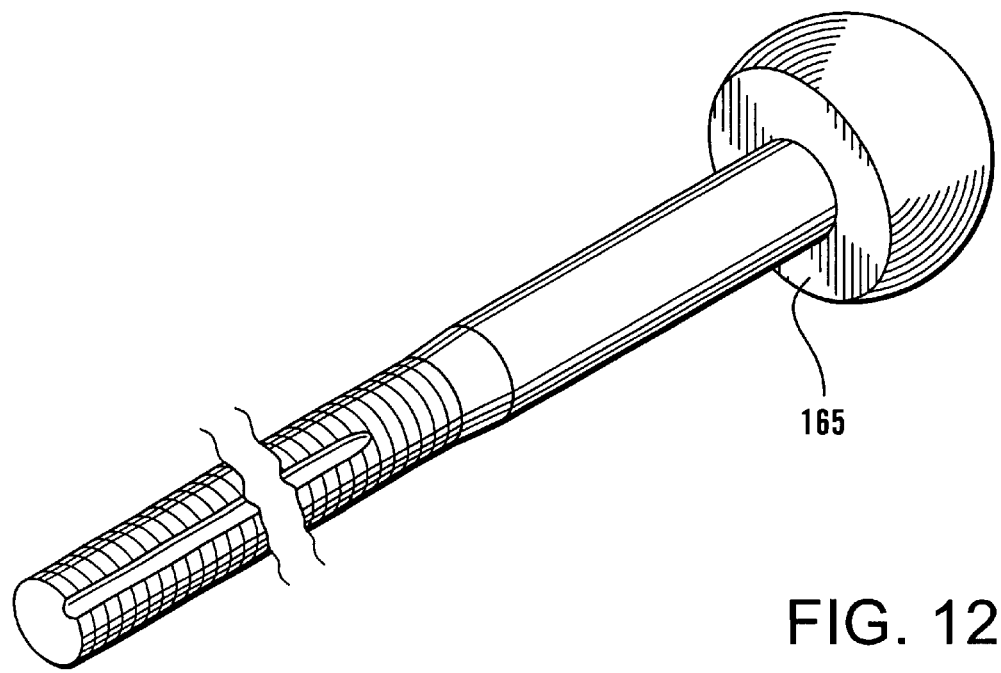
FIG. 12 is a perspective view of a semi-spherical ball stud.

The increased pull-out force of the present invention has been demonstrated with pull-out and insertion force testing. It has been found that when a socket is made from a particular material, e.g., the plastic Zytel 103 Nylon, and in accordance with conventional designs such as the socket of FIGS. 1 and 2, the average pull-out force is significantly lower than that which results when the socket design is in accordance with the present invention. Even higher pull out resistance has been achieved using semi-spherical ball stud profiles as shown in FIG. 12 because the trailing edge 165 of the truncated sphere increases contact friction between the ball and socket which in-turn increases negative Fr and Ft component forces.

Figure 11:
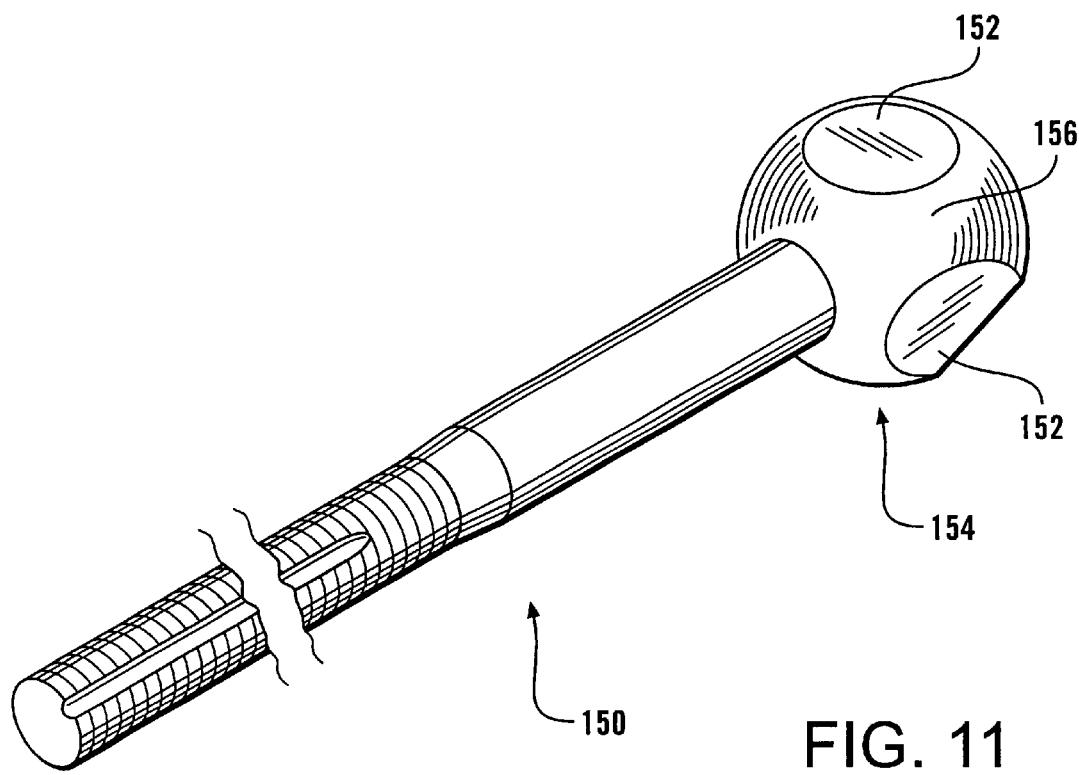
FIG. 11 is a perspective view of a disengagable ball stud.

To insert a disengagable style ball stud 150, such as that shown in FIG. 11, the indents or flats 152 on the head 154 are oriented toward the arms 112 on the socket 100, and the rounded portions 156 of the head 154 are oriented toward the relief areas 158, as seen in FIG. 4. The head 128 is inserted into the socket 100. The head is then rotated to engage the rounded portions 156 of head 154 with the arms 112 of the socket 100. Alternatively, head 154 of ball stud 150 can be inserted into the socket 100 in a manner similar to how a conventional ball stud 150 is inserted into a socket 100, that is, by snapping the head 154 past the arms 112, as previously described herein. If removal of the adjuster from the lamp assembly is desired, ball stud 150 can be disengaged from the socket 100 by rotating the ball stud 150 such that the arms 112 of the socket 100 no longer engage the round portions 156 of ball stud 150, and the rounded portions 156 of ball stud 150 are oriented toward the relief areas 158. Ball stud 150 can thus freely pass from the socket 100 because flats 152 on ball stud 150 can pass by arms 112 on socket 100, and rounded portions 156 can pass through relief areas 158.

Figure 13:
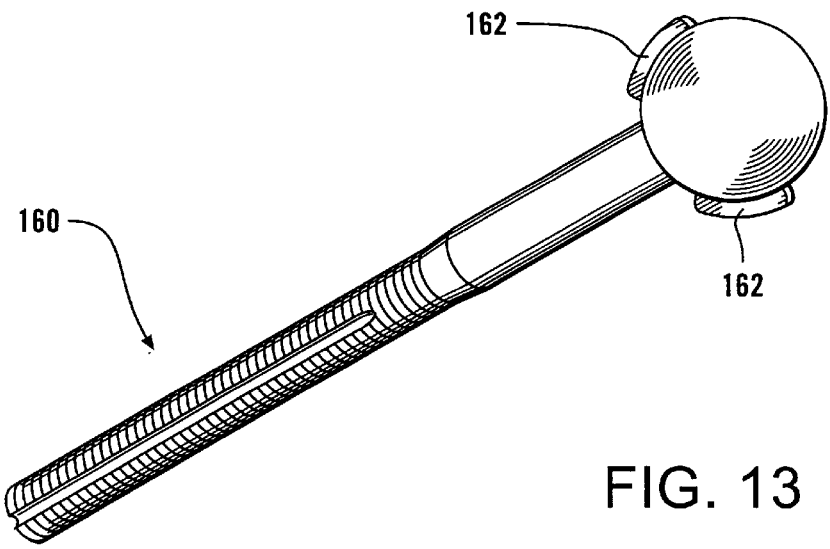
FIG. 13 is a perspective view of a ball stud with ears.

In an additional embodiment, as shown in FIG. 13, the improved socket 100 may be used with "eared" ball studs 160 to prevent rotation of the ball stud. FIG. 13 show the ears 162 on an eared ball stud 160. In this embodiment, the improved socket 100 provides ear slots 164 in between the support legs 120 and arms 112 as shown in FIG. 4. When an eared ball stud 160 is fitted into the socket 100, the ears 162 slide into the ear slots 164. Because the ears 162 are engaged in ear slots 164, eared ball stud 160 cannot rotate with respect to the socket 100. As previously described, the leg extensions 133 are provided to allow the socket 100 to non-rotatably mount on a square boss. This non-rotatable mounting allows the socket 100 to be effectively used with a conventional eared ball stud 160 because it ensures proper orientation of the ear slots 164 and prevents rotation of the socket 100. In addition to being most effective with an eared ball stud 160, the improved socket 100 with ear slots 164 can also be used with a disengageable or a conventional ball stud. The ability to use the socket 100 with a wide variety of ball studs provides a significant benefit to headlamp assemblers because it allows the use of one style of socket with a number of types of ball stud.

In yet an additional embodiment of the present invention shown in FIG. 10, the improvements of socket 100 may incorporated into a conventional "peanut style" socket 170. The difference between this socket and socket 100 is the extension 172 of face place 122, the optional ridged edges 173 to resist moment forces applied to extension 172, and the lack of a chamber for mounting a screw. Extension 172 has an aperture 174 therein for mounting purposes, as is known in the art.

The improved socket 100 is preferably manufactured using conventional injection molding technology. The mounting screw 102 can also be manufactured using conventional methods. Prior to shipment to the headlamp assembler, each socket 100 is preferably snap-fitted with a mounting screw 102 using automated or hand means. Of course, other process and methods could be used to manufacture pieces and assemble the assembly.

Figure 14:
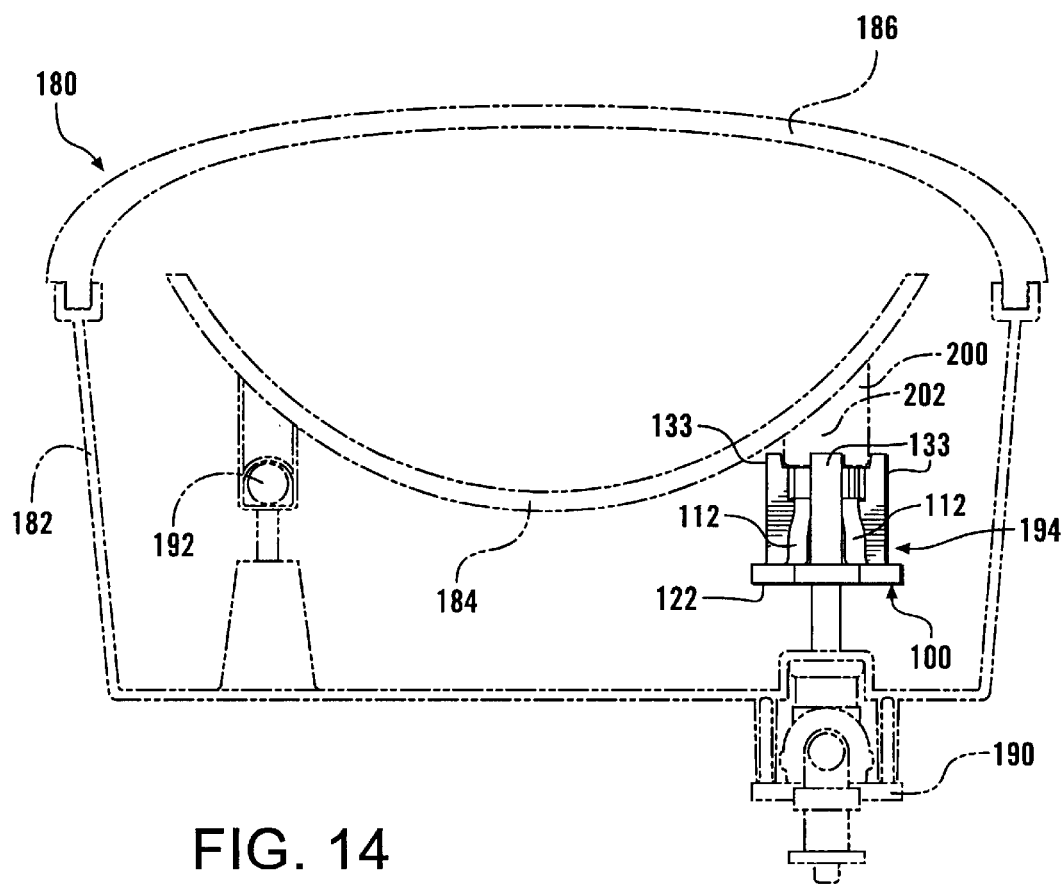
FIG. 14 is a partial cross-section of an automotive lamp assembly having a socket constructed in accordance with one embodiment of the present invention installed to a reflector.

FIG. 14 shows an improved socket 100 installed in a lamp assembly 180 shown in phantom. The lamp assembly 180 includes a support frame 182, a reflector 184, a lens 186, a bulb (not shown), and one or more adjusters 190. The support frame 182 houses the reflector 184 and the bulb on a pivotable mounting to allow the aim of the lamp to be adjusted using the adjuster 190. The lens 186 seals the front of the assembly to protect it from the elements assailing the front end of the vehicle and provide an aerodynamic shape and attractive appearance. In such a lamp assembly 180, the reflector 184 mounts inside the housing one fixed ball joint 192 and is adjustable horizontally and vertically using adjusters 190 (only one shown in FIG. 14) that interface with the reflector 184 by moving ball joint 194. FIG. 14 shows the improved socket 100 secured to a square boss 200 extending from the reflector 184. The leg extensions 133 of the socket 100 interface with the sides 202 of the square boss 200 to non-rotatably engage the socket 100 with the boss 200.

The socket of the present invention has many other applications aside from use in a lamp assembly. Thus, although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:
1. A ball socket comprising:
a face plate having a ball stud receiving opening;
a socket body having a socket cup with an undercut portion defining a chamber;
a plurality of arms extending from the face plate to a location past the chamber; a mounting screw having a head rotatably disposed within the chamber of the socket, wherein the plurality of arms form a socket cup, wherein the plurality of arms have an upper portion, a middle portion and a bottom portion, and wherein at least the upper portion and the middle portion deform in response to a moment force applied to the plurality of arms during insertion of a ball stud;
a plurality of support legs depending from the face plate, each of the plurality of legs having an upper portion, a middle portion and a bottom portion, the plurality of legs providing structural stability to the socket; and
wherein the upper portions of the plurality of arms extend further into the ball stud receiving opening in the face plate than do the upper portions of the support legs.

2. A ball socket for pivotally connecting a ball stud to a boss, the ball socket comprising:
a socket body having a ball stud receiving opening;
a plurality of arms forming a socket cup within the socket body, the plurality of arms adaptable for retaining the ball stud within the socket cup;
a plurality of support legs interposed between the plurality of arms, wherein each of the plurality of legs have an upper portion, a middle portion and a bottom portion;
wherein each arm of the plurality of arms has an upper portion positioned proximate a face plate, a middle portion and a bottom portion, with at least two portions of each arm contacting the ball stud aftr the ball stud is fully inserted;
wherein at least the upper portion and the middle portion of each arm of the plurality of arms deforms in response to a moment force applied to the middle portion during insertion of the ball stud; and
wherein each of the upper portions of the plurality of arms extend toward a center axis of the socket more than the upper portions of the plurality of support legs.

3. The ball socket of claim 2 further including an undercut portion positioned proximate the bottom portion of the plurality of arms, the undercut portion defining a chamber adapted for receiving a mounting screw head.

* * * * *